April 17, 1956 D. W. VAN GIESON 2,741,860

TELEPHONE INDEX

Filed May 11, 1953 3 Sheets-Sheet 1

INVENTOR.
David W. Van Gieson
BY
George H. Mitchell, Jr.

TELEPHONE INDEX

Filed May 11, 1953 3 Sheets-Sheet 2

INVENTOR.
David W. Van Gieson
BY
George H. Mitchell, Jr.

April 17, 1956 D. W. VAN GIESON 2,741,860

TELEPHONE INDEX

Filed May 11, 1953 3 Sheets-Sheet 3

INVENTOR.
David W. Van Gieson
BY
George H. Mitchell, Jr.

United States Patent Office 2,741,860

Patented Apr. 17, 1956

2,741,860

TELEPHONE INDEX

David W. Van Gieson, Yonkers, N. Y.

Application May 11, 1953, Serial No. 354,323

7 Claims. (Cl. 40—10.5)

This invention relates to a telephone number listing index, and more especially to a type designed to rest freely and unattached between the corner supporting feet on the under side of a modern telephone instrument of the cradle handset type.

One object of the invention is to provide an index of a type heretofore unavailable, which will hold its position with relation to the telephone instrument without being physically attached thereto, and without acting as a support therefor, thus avoiding any violation of telephone company regulations pertaining to foreign attachments to its rented equipment and insuring against any interference with the use or the proper functioning of the telephone instrument.

Another object is to provide an index of such compact design as to be inconspicuous when in a position largely of concealment under a telephone instrument.

Another object is to provide a type of sliding index which will readily permit the number about to be called to be so aligned that it can be quickly sought by the eye during the process of dialing the number.

Another object is to provide a sliding index that will afford protection of the index material against soiling, blurring, effacement, or mutilation through handling.

Another object is to provide a readily accessible index or directory of telephone numbers frequently called, conveniently located with relation to the telephone instrument, wherein, as exemplified in the embodiment to be described, the simplicity and economy of construction is such as to employ only simple sheet stampings and conventional fasteners.

Still another object is to provide novel means whereby a sheet of paper may be removably attached to a backing of stiff material whereby the paper may be quickly and easily removed from the backing for the purpose of making changes in listings.

With the above and other objects in view, which will be apparent from the following description and accompanying drawings, the invention resides in the novel and economical construction, and the combination and arrangement of parts as hereinafter described and claimed, it being understood that various modifications of the embodiment disclosed may be made within the scope of the appended claims.

More particularly, the invention comprises a frame piece designed for lodgement between the corner supporting feet on the under side of a telephone instrument, movable slide pieces for receiving, holding, and exposing the indexed material, and accessory fastening and spacing means.

Figures 1, 2:
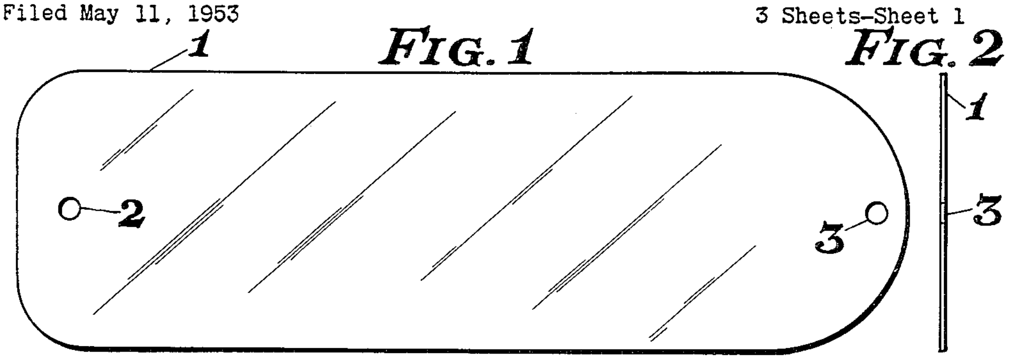
Figures 3, 4:
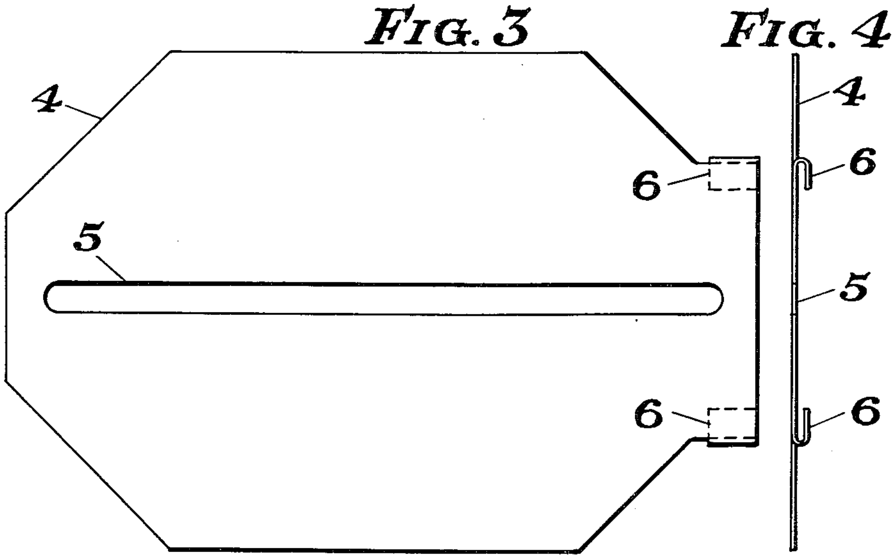
Figures 5, 6:
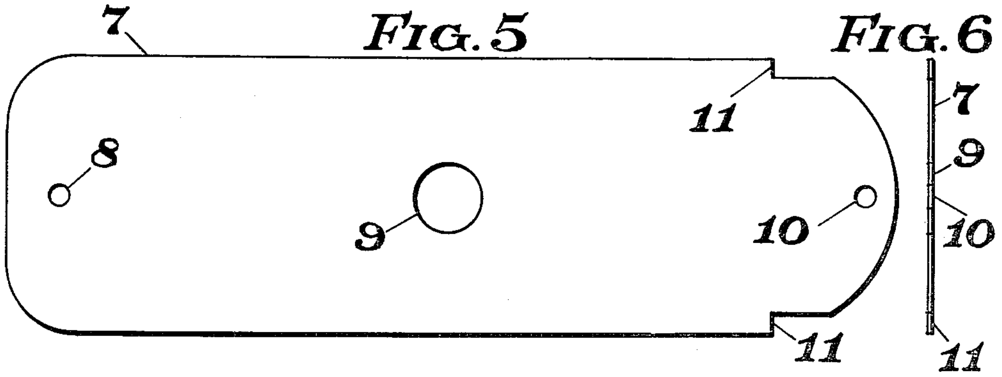
Figures 7, 8, 9, 10, 11:
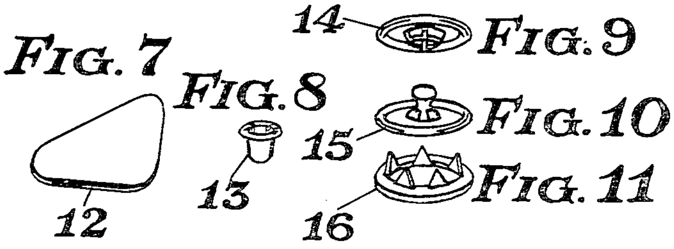
Figures 12, 13, 14, 15:
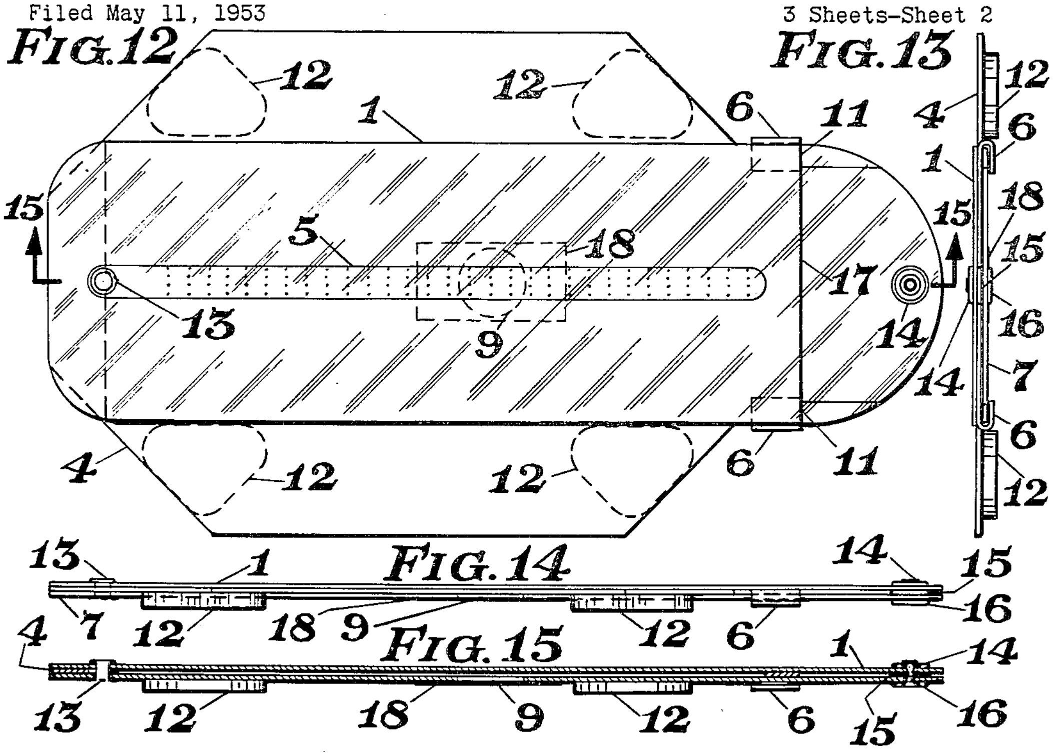
Figure 16:
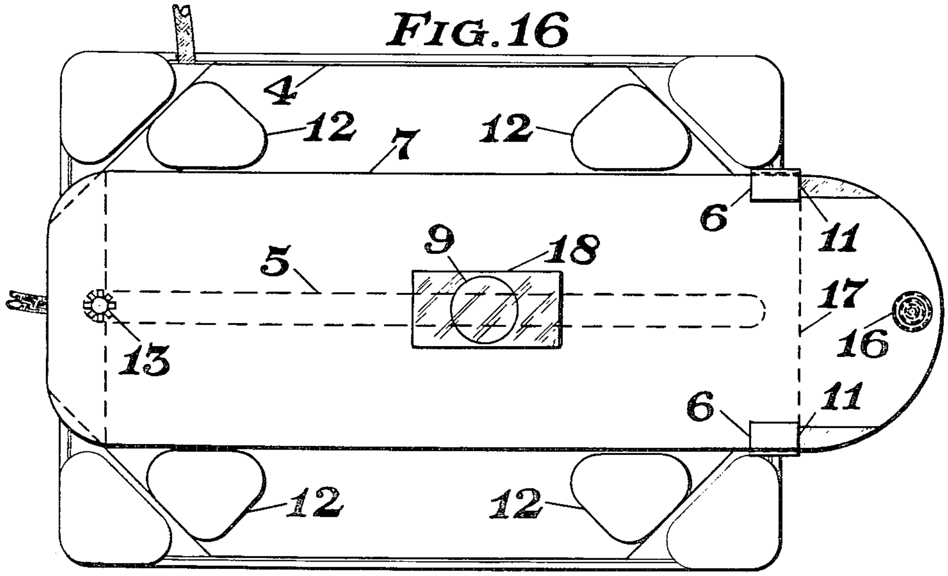

Fig. 1 is a plan view of the top slide piece which may be transparent; Fig. 2 is an end view of the top slide piece; Fig. 3 is a plan view of the frame piece; Fig. 4 is an end view of the frame piece; Fig. 5 is a plan view of the bottom slide piece; Fig. 6 is an end view of the bottom slide piece; Fig. 7 is a perspective view of one of the spacing pads; Fig. 8 is a perspective view of a fastening eyelet; Figs. 9, 10 and 11 are enlarged perspective views of the elements of another fastener; Fig. 12 is a plan view of the device completely assembled with index material in place; Fig. 13 is an end view of the assembled device; Fig. 14 is a side elevation of the assembled unit; Fig. 15 is a sectional elevation taken on the line 15—15 of Fig. 12; Fig. 16 is a plan of the assembled unit viewed from the bottom when positioned in the space between the corner supporting feet of a telephone base; and Fig. 17 is a perspective view of the device in use under a telephone base with the slide pieces partially withdrawn.

Referring now in detail to the accompanying drawings, Figs. 1–11 depict the several elements comprising the complete device, except for the index sheet 17, which may be a sheet of ordinary paper on which are printed, or written, the telephone number listings. Top slide piece 1 may be formed of plastic or other suitable transparent material. Frame piece 4 and bottom slide piece 7 need not be transparent and can be formed of plastic, fiber, or other suitable material. Spacing pads 12, placed on the under side of the frame piece, are of rubber, cork, a composition thereof, or other suitable material. Because of the extremely light construction of the telephone index the spacing pads need not function as cushions but serve to elevate the main body of the assembly so that the bottom slide piece 7 will slide clear of the top surface of the desk, table, or other object supporting the telephone base.

With particular reference to Figs. 12–16, showing the assembly of the various elements of the device, index sheet 17 is preferably the same width as the bottom slide piece 7 and should extend from the corner edges 11 to the fastening means 13. Sheet 17, with the written matter face up rests on top of the bottom slide piece 7, which is provided with a centrally disposed aperture 9 across which may be placed a strip of pressure-sensitive adhesive material which will thus adhere to the lower surface of both the bottom slide piece and the back of the index sheet 17 which is exposed through the aperture. The sheet will thereby be held in place, while at the same time it may be easily removed for the purpose of making a change in the listing or to be replaced by a new index sheet. A fastening means, such as an ordinary eyelet 13, passes through openings 2 and 8 provided respectively in slide pieces 1 and 7, and also through a longitudinal slot 5 provided in frame piece 4 to secure the slide pieces together, one above and the other below the frame piece, allowing the slide pieces to be moved back and forth with respect to the frame piece. Slide pieces 1 and 7 are further maintained in superposed relation by virtue of a separable fastener, such as an ordinary garment snap fastener, inserted through openings 3 and 10 provided respectively in the top and bottom slide pieces. Furthermore, the ridged portion 15 of this type of fastener will provide a certain amount of spacing between the slide pieces and enable them to move more easily. In order to guide the movement of the slide pieces the frame piece may have projections 6 which are turned downwardly and inwardly to engage the side margins of the bottom slide piece 7. The slide pieces can be moved in unison while their extreme backward and forward positions are limited by the movement of fastener means 13 in the slot 5 of the frame piece.

Figure 17:
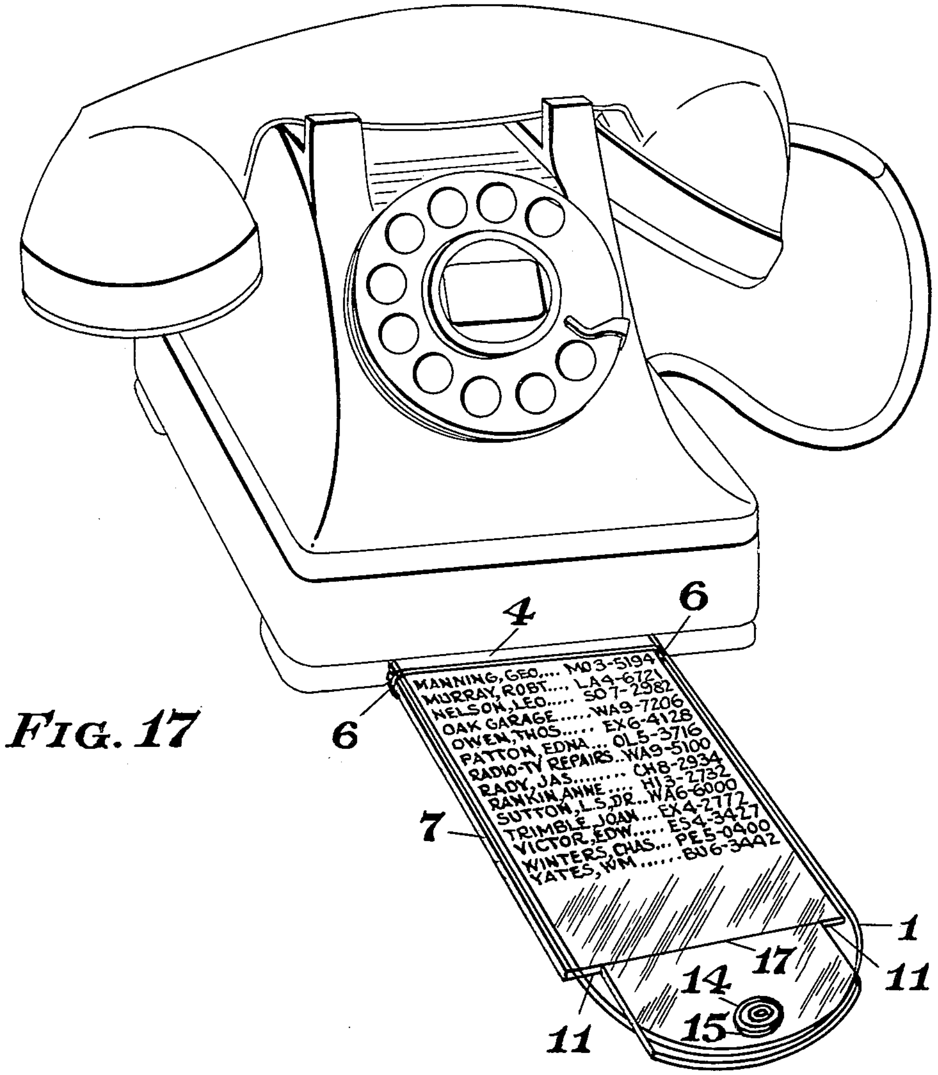

For use in connection with a telephone the index device is merely placed on the surface which is to support the telephone stand and the telephone instrument is placed in position to straddle the device, as shown in Fig. 17. It will also be apparent, that the index device will move with the telephone stand if any sliding movement is imparted to the stand while resting on a supporting surface.

In operation the slidable elements may be withdrawn so that the name of the party to be called, and the telephone number, are in alignment with the front edge of the telephone stand. This operation sets the desired listing in a position where it can be readily observed by the eye during the process of dialing, leaving the hands free.

The withdrawal of the slidable elements, or their restoration to a position under the telephone instrument, is accomplished respectively by sustained backward or forward pressure of the finger tips exerted on the fastener means at the front. To renew the index sheet the slidable elements are fully withdrawn, the snap fastener removed, and the index sheet detached from the portion of pressure-sensitive tape 18 to which it is exposed through aperture 9. A new sheet may then be inserted and secured by contact with tape 18, and the snap fastener replaced.

Space at the forward end of the slidable members is not utilized for listing of numbers. This area is at all times exposed to view and therefore can be used to advantage for the accommodation of a trademark, advertising material, or other display matter.

I claim:

1. A device of the character described for use with a telephone stand having four downwardly projecting rectangularly spaced supporting feet, comprising, a generally rectangular flat frame element of sheet material to be supported only by the surface which supports the telephone stand having marginal corner portions each disposed to abut loosely a supporting foot of said stand to confine said frame element therebeneath, a generally rectangular flat indicia supporting element of sheet material having at least two opposely disposed parallel margins to be slidable into and out of the space beneath said stand and between a pair of said supporting feet, said frame element being slotted longitudinally in the direction of movement of said indicia supporting element and having integrally formed marginally disposed projecting guide portions to slidably embrace said oppositely disposed parallel marginal portions of the indicia supporting element, and a flanged connector means passing through said slotted portion of the frame element to attach said indicia supporting element thereto and to limit slidable movement thereof.

2. A device of the character described for use with a telephone stand having four downwardly projecting rectangularly spaced supporting feet, comprising, a generally rectangular flat frame element of sheet material to be supported only by the surface which supports the telephone stand having marginal corner portions each disposed to abut loosely a supporting foot of said stand to confine said frame element therebeneath, a generally rectangular flat indicia supporting element of sheet material having at least two oppositely disposed parallel margins to be slidable into and out of the space beneath said stand and between a pair of said supporting feet, a generally rectangular flat cover element of transparent sheet material substantially coextensive with said indicia supporting element, said frame element being slotted longitudinally in the direction of movement of said indicia supporting element, fastener means to connect said cover element and said indicia supporting element at one of their ends and passing through said slotted portion of the frame element to limit slidable movement of the indicia supporting element, and separable fastener means connecting said cover element and said indicia supporting element at their other ends exteriorly of said frame element.

3. A device as defined in claim 2, wherein said indicia supporting element is provided with an aperture therein, whereby an additional indicia supporting sheet of material may be positioned on said first mentioned indicia supporting element by means of a strip of pressure-sensitive adhesive material applied across said aperture in contact with the lower surface of said first and second mentioned indicia supporting means.

4. A device as defined in claim 2, wherein said frame element is provided with integrally formed marginally disposed projecting guide portions to slidably embrace said oppositely disposed parallel marginal portions of the indicia supporting element.

5. A device as defined in claim 2, wherein said indicia supporting element is positioned below the frame element and the cover element is positioned above the frame element.

6. A device as defined in claim 2, wherein at least one of said slidable elements is positioned below said frame element, and said frame element is provided with supporting feet of less height than the supporting feet of said stand, whereby a slidable element will be disposed free of sliding contact with the supporting surface below.

7. A device as defined in claim 6, wherein said frame element is provided with integrally formed marginally disposed projecting guide portions to slidably embrace said oppositely disposed parallel marginal portions of the indicia supporting element.

References Cited in the file of this patent

UNITED STATES PATENTS 2,432,760 Higbee ---------------- Dec. 16, 1947